United States Patent [19]
Leonardi

[11] Patent Number: 5,819,827
[45] Date of Patent: Oct. 13, 1998

[54] STUMP GRINDER TOOTH AND POCKET COMBINATION

[75] Inventor: Joseph Leonardi, Auburn, N.Y.

[73] Assignee: Leonardi Manufacturing Co., Inc., Weedsport, N.Y.

[21] Appl. No.: 985,652

[22] Filed: Dec. 5, 1997

[51] Int. Cl.⁶ ............................. B27G 13/04; A01G 23/06
[52] U.S. Cl. ....................... 144/241; 144/24.12; 144/218; 241/294; 407/46; 299/91; 299/92
[58] Field of Search .................. 83/835–845; 144/24.12, 144/218, 241; 241/294; 407/2, 33, 46, 47, 44, 51, 113; 299/39, 71, 79, 91, 92, 93, 94

[56] References Cited

U.S. PATENT DOCUMENTS

| | | | |
|---|---|---|---|
| 2,135,035 | 8/1938 | Mills | 144/241 |
| 3,778,112 | 12/1973 | Krekeler | 299/92 |
| 3,856,359 | 12/1974 | Krekeler | 299/92 |
| 4,744,278 | 5/1988 | Wright | 144/241 |
| 4,998,574 | 3/1991 | Beach et al. | 144/241 |
| 5,261,306 | 11/1993 | Morey et al. | 144/241 |
| 5,279,345 | 1/1994 | Le Maux et al. | 144/24.12 |

Primary Examiner—W. Donald Bray
Attorney, Agent, or Firm—George R. McGuire

[57] ABSTRACT

A stump grinding apparatus having a tooth which is automatically retained with respect to, and appropriately gauged from a pocket. The tooth includes an elongated shank portion having front and rear ends and a head portion integrally extending from the front end of the shank portion. In a preferred embodiment of the present invention, a pair of longitudinally spaced holes are formed through the shank portion adjacent its rear end. A pin may be inserted through one of the two holes formed through the shank portion, with the chosen hole being dependent upon whether the shape of the pocket being used is either entirely round or partially round with a straight rear edge. When the tooth is securely clamped to the stump grinding wheel via the pocket, the pin is positioned in abutting relation to the rear end of the pocket, thereby preventing the tooth from moving axially with respect to the pocket. In addition, by choosing the appropriate hole through which to insert the pin, dependent upon the shape of pocket being utilized, when the pin is positioned in abutting relation to the rear edge of the pocket, the gauging distance of the cutting bit from the front edge of the pocket will be automatically set.

14 Claims, 7 Drawing Sheets

FIG. 7A

STUMP GRINDER TOOTH AND POCKET COMBINATION

BACKGROUND OF THE INVENTION

The present invention generally relates to stump grinder apparatus, and more particularly to cutting teeth and corresponding pockets used to mount the teeth to a stump grinder wheel.

Stump grinders are well known in the art. Generally, these devices include a large wheel (or disk) mounted to the drive shaft of a motor for rotation about its central axis. A plurality of cutting teeth are securely mounted around the wheel's periphery with the cutting edge of each tooth extending radially outward from the wheel's edge. The teeth are typically secured to the wheel by a pocket which includes a recessed slot in which the shank of a tooth snugly sits, and at least one bolt hole formed through the pocket on each side of the slot. The bolts pass through the bolt holes and through holes formed through the wheel, thereby securely clamping the teeth between the pockets and wheel.

In operation, the wheel is moved towards a stump while rotating about its central axis ultimately causing the cutting edge of the teeth to engage, and consequently cut away, the stump.

By continuously moving the wheel back and forth across the stump, the cutting teeth will continuously degrade the stump.

The reaction force exerted on each tooth by a stump is in a direction that extends perpendicularly into the cutting edge and tangential to the radial path of the wheel (and teeth), thereby causing one wall of the tooth's shank to be forcibly biased against a sidewall of the slot formed in the pocket. One consequence of this reaction force is that a tooth will sometimes be pulled out from in between the pocket and wheel due, in part, to an inadequate amount of torque applied to the bolts holding the pocket to the wheel, in part, to the inherent physical force experienced by the tooth, and, in part due to the centrifugal force on the tooth caused by the rotating wheel. When a tooth becomes disengaged from the wheel, a safety hazard is created as the tooth may, in its travel, impact upon an individual. In addition, the lost tooth creates worker down time as a new tooth must be mounted to the wheel in place of the lost tooth.

Another factor that contributes to worker down time and potential safety hazards is the gauging of a tooth in a pocket. Depending primarily upon the length of a tooth, there is a predetermined, desirable distance separating the tip of the cutting bit from the leading (or front) edge of the pocket (conventionally referred to as the "gauging distance"). With conventional tooth/pocket combinations a worker has to manually measure the appropriate gauging distance prior to torquing the pocket to the wheel. Not only does the measuring itself take time, but the tooth sometimes shifts in the pocket during the torquing process, thereby requiring the process to be redone. If the gauging distance is too great or too small, the torque experienced by the tooth's shaft is accordingly too great (causing early breakage) or too small (causing ineffective cutting), respectively.

It is therefore a principal object and advantage of the present invention to provide a stump grinder tooth and pocket combination which securely and automatically retains the tooth within the pocket.

It is an additional object and advantage of the present invention to provide a stump grinder tooth and pocket combination that automatically provides the preferred gauging distance.

It is a further object and advantage of the present invention to provide an improved stump grinder tooth that is easily and inexpensively manufactured.

It is yet another object and advantage of the present invention to provide a stump grinder tooth and pocket combination that has improved safety features incorporated therein.

Other objects and advantages of the present invention will in part be obvious, and in part appear hereinafter.

SUMMARY OF THE INVENTION

In accordance with the foregoing objects and advantages, the present invention provides a new and improved tooth and pocket combination for use on a conventional stump grinder apparatus which includes a wheel mounted to the drive shaft of a motor for rotational movement about its central axis. A plurality of cutting teeth are securely mounted on each side of, and circumferentially about the peripheral edge of the rotating wheel via tooth retaining pockets which are fastened to the wheel via bolts.

Each tooth includes a head portion which includes a hardened cutting bit, preferably made of tungsten carbide, or a material having hardness properties similar thereto, and a shank portion integral with the head portion. The head portion extends outwardly beyond the edge of the wheel and the shank portion is positioned in clamped relation between a side of the wheel and within a slot formed longitudinally through a pocket. The rear end of each tooth extends outwardly beyond the rear edge of the pocket and includes a pin extending therethrough, preferably in a direction transverse to its longitudinal axis, although the pin may extend in any direction. When the tooth is properly positioned in the slot, the pin will be positioned in firm, contacting relation to the rear surface of the pocket, and will extend transversely across the slot formed through the pocket. In mounting the pocket and tooth to the wheel, by positioning the tooth in the slot with its pin abutting the rear surface of the pocket, the gauging distance of the tooth is automatically set. Moreover, by having the pin positioned in abutting relation to the pocket's rear surface the tooth will be securely retained within the pocket during the cutting operation. Accordingly, the pin provides both self gauging and self retaining properties to the tooth and pocket combination.

DETAILED DESCRIPTION

Figure 1:
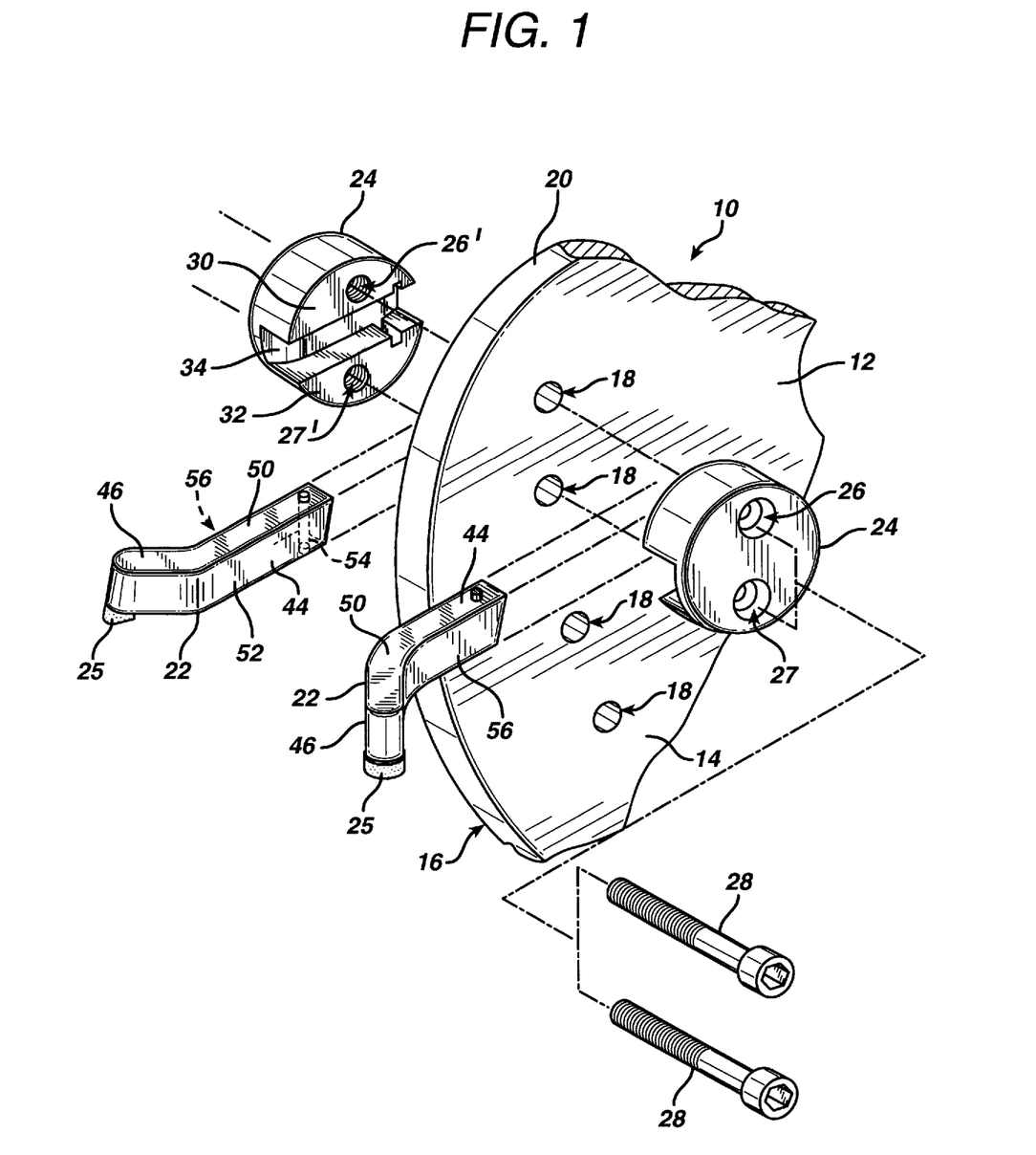
FIG. 1 is a partial perspective view of a stump grinding apparatus.

With reference to the accompanying drawings, wherein like reference numerals refer to like parts throughout, there is seen in FIG. 1 a portion of a stump grinder apparatus, denoted generally by reference numeral 10, having a wheel 12 mounted thereto for rotational movement about its central axis. Wheel 12 is conventional in stump grinding apparatus in that it includes first and second opposite, planar faces 14 and 16, respectively, extending in spaced, parallel planes to one another while being bridged by a peripheral edge 20. Wheel 12 further includes several pairs of holes 18 formed therethrough which are positioned adjacent peripheral edge 20. Furthermore, as is also conventional with stump grinding apparatus, a plurality of teeth 22 are secured to wheel 12 by means of respective pockets 24, each one of which clamps a tooth 22 between itself and wheel 12. The cutting bit 25 of each tooth 22 extends beyond edge 20, thereby permitting cutting bit 25 to be moved into engaging relation with a stump without interference from wheel 12.

Figure 5:
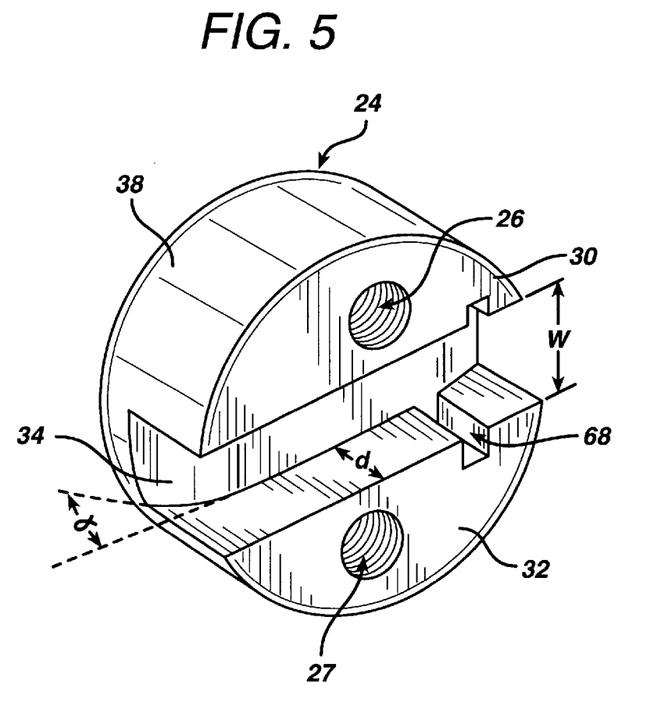
FIG. 5 is a perspective view of a first stump grinding pocket.
Figure 5A:
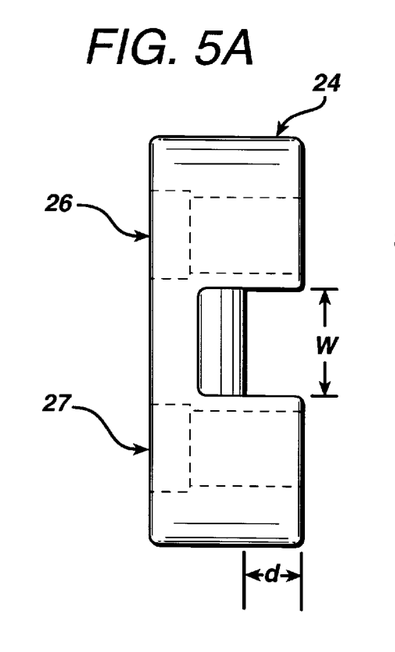
FIG. 5A is a front elevational view of a first stump grinding pocket.
Figure 5B:
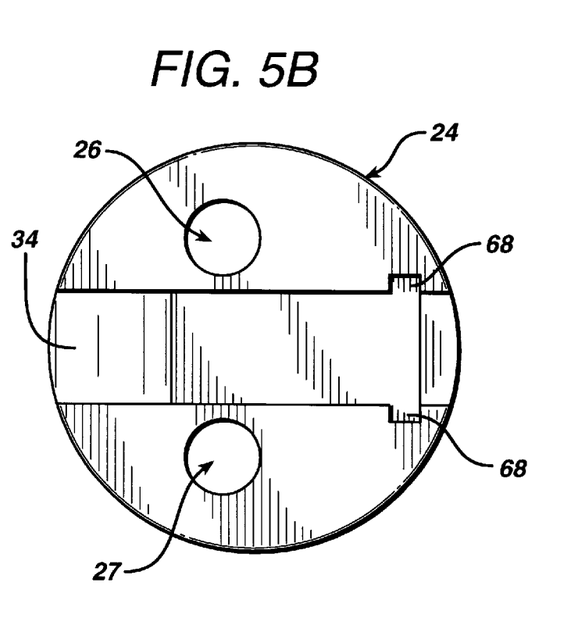
FIG. 5B is a top plan view of a first stump grinding pocket.
Figure 6:
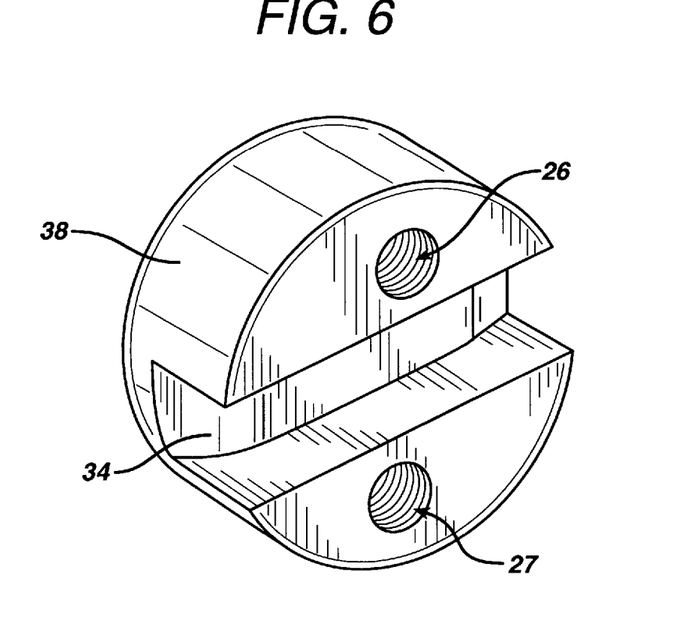
FIG. 6 is a perspective view of a second stump grinding pocket.
Figure 6A:
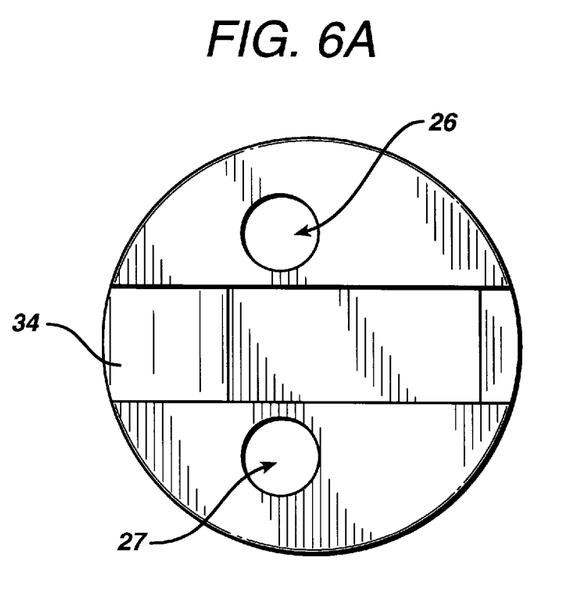
FIG. 6A is a top plan view of a second stump grinding pocket.
Figure 7:
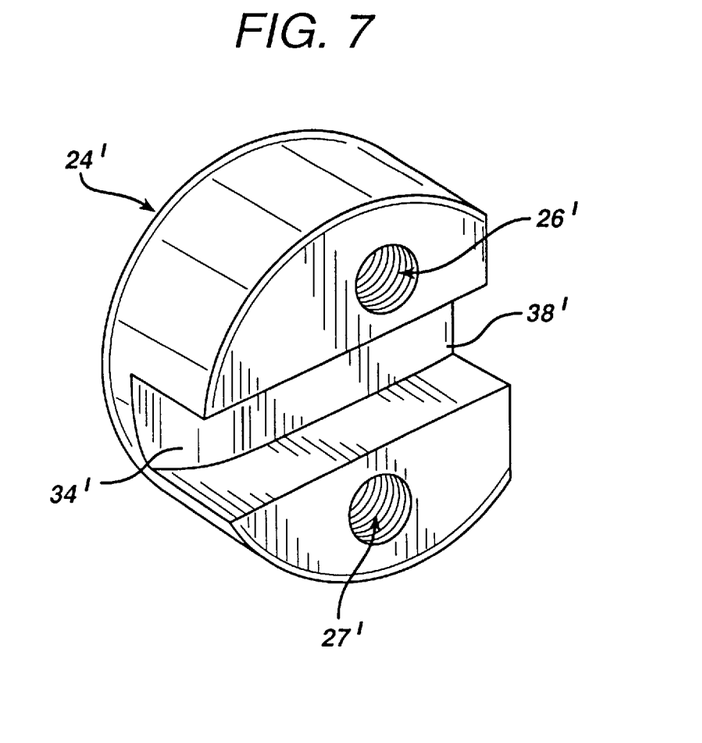
FIG. 7 is a perspective view of a third stump grinding pocket.
Figure 7A:
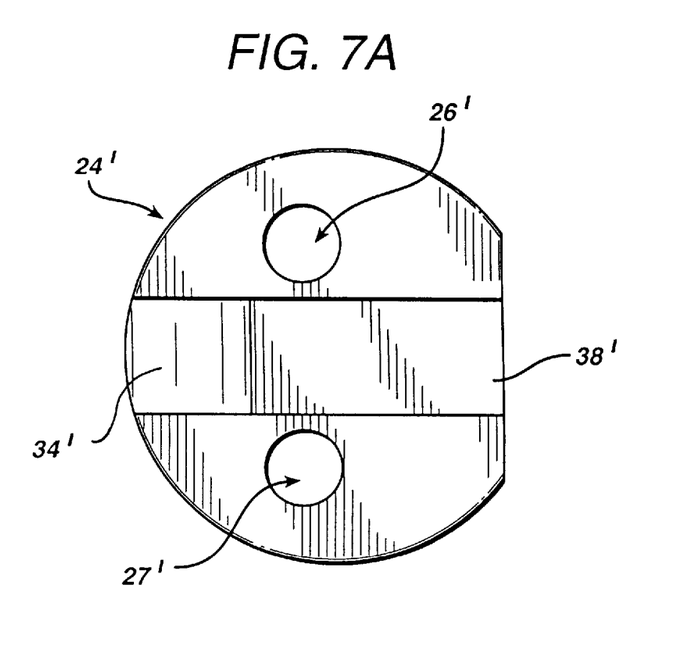
FIG. 7A is a top plan view of a third stump grinding pocket.

As clearly shown in FIGS. 5–7, each pocket 24 mounted to surface 14 includes first and second counter-bored hole 26 and 27, respectively while each pocket 24 mounted to surface 16 includes threaded holes 26' and 27', respectively, for receiving screws 28 therethrough. It is important to note that the head of screws 28 sit flush in the counter-bored holes 26 and 27 in order to prevent rocks and other debris from coming into contact with the screw heads. First and second half portions 30 and 32, respectively, extend in a common plane and are separated, but bridged, by a slot 34 which extends along a longitudinal axis diametrically across pocket 24. Slot 34 is of a predetermined depth d and width W (see FIG. 5A) sufficient to accommodate tooth 22 therein. Slot 34 includes a leading edge 36 which is chamfered so as to slope inwardly at a predetermined angle $\alpha$ (see FIG. 5, the angle preferably being about a 45° angle), thereby further accommodating tooth 22. Pocket 24 may be essentially circular in shape, or, a portion of its trailing, peripheral edge 38, may be milled flat (see FIGS. 7–7A). The circular pocket 24 obviously includes a slot 34 of a greater length than the slot 34' of the milled pocket 24'.

Figure 2:
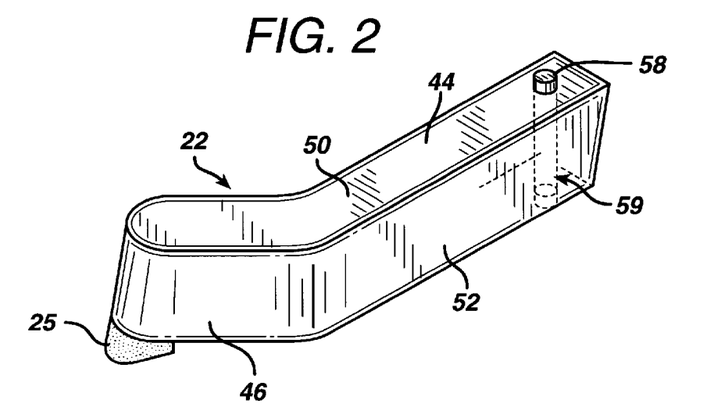
FIG. 2 is a perspective view of a first stump grinding tooth.
Figure 2A:
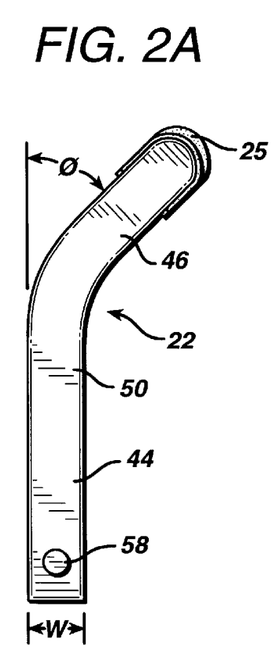
FIG. 2A is a top plan view of a first stump grinding tooth.
Figure 2B:
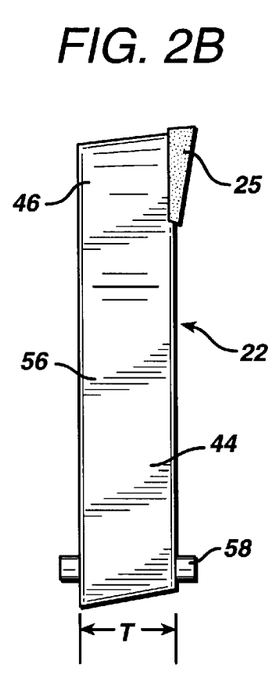
FIG. 2B is a side elevational view of a first stump grinding tooth.
Figure 2C:
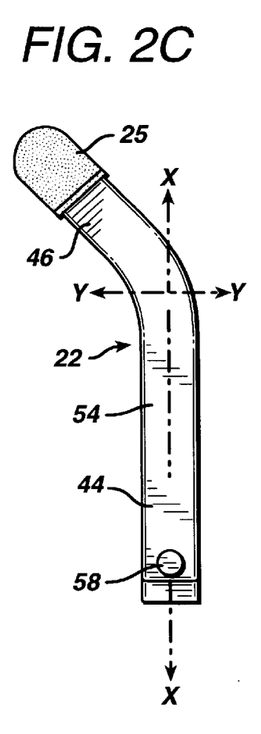
FIG. 2C is a bottom plan view of a first stump grinding tooth.
Figure 2D:
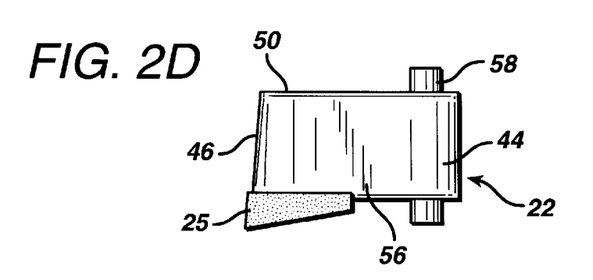
FIG. 2D is a front elevational view of a first stump grinding tooth.

Each tooth 22 includes an elongated shaft portion 44 and a head portion 46 integrally and longitudinally extending from shaft portion 44. A hardened cutting bit 25, preferably composed of tungsten carbide or another material having hardness properties similar thereto, is fixedly attached to head portion 46 through a brazing or other attachment process, and is positioned on the surface of head portion 46 which contacts a stump when wheel 12 is rotating, thereby effecting a downward force on the stump. Shaft portion 44 is of a width w (see FIG. 2A), slightly smaller than the slot's width W, and a thickness T (see FIGS. 2B), slightly larger than the slot's depth d, and includes four planar walls 50, 52, 54 and 56 which conform to the floor and sidewalls of slot 34. In addition, tooth 22 bends at an angle $\Theta$ (see FIG. 2A, the angle preferably being about 45 degrees) about an axis Y-Y (see FIG. 2c) transverse to its longitudinal axis X-X (see FIG. 2c) at the interface between shaft portion 44 and head portion 46. The bend in tooth 22 corresponds with the slant of slot 34, thereby permitting a complimentary fit between tooth 22 and slot 34.

Figure 3:
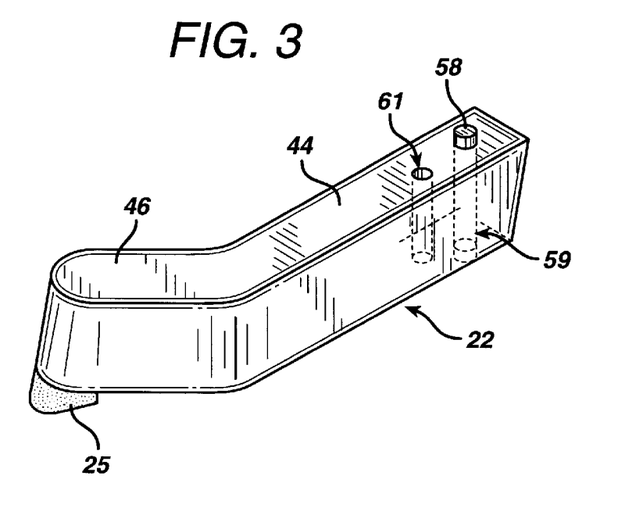
FIG. 3 is a perspective view of a second stump grinding tooth.
Figures 3A, 3B:
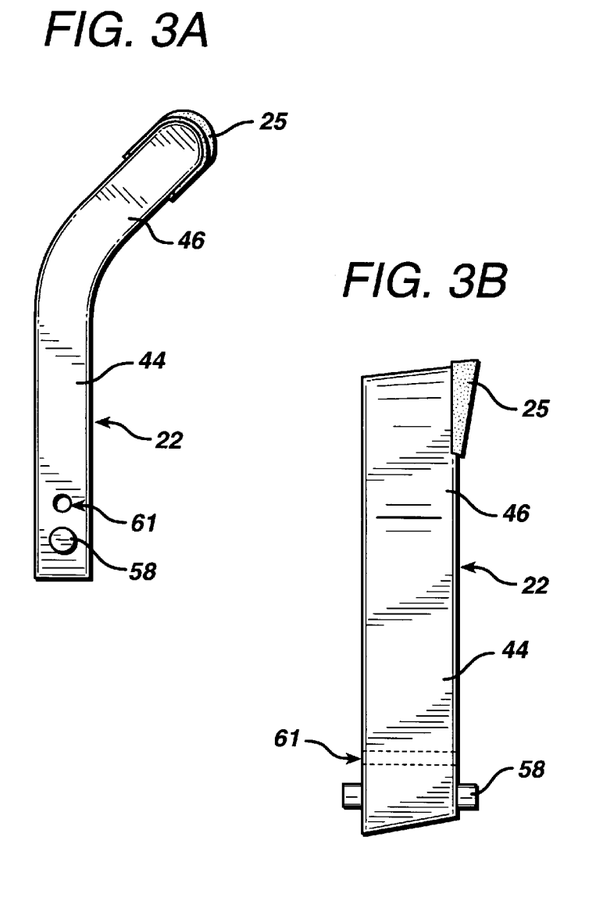
FIG. 3A is a top plan view of a second stump grinding tooth.
FIG. 3B is a side elevational view of a second stump grinding tooth.
Figure 3C:
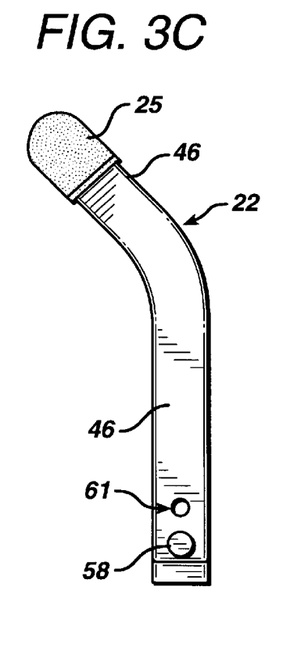
FIG. 3C is a bottom plan view of a second stump grinding tooth.
Figure 4:
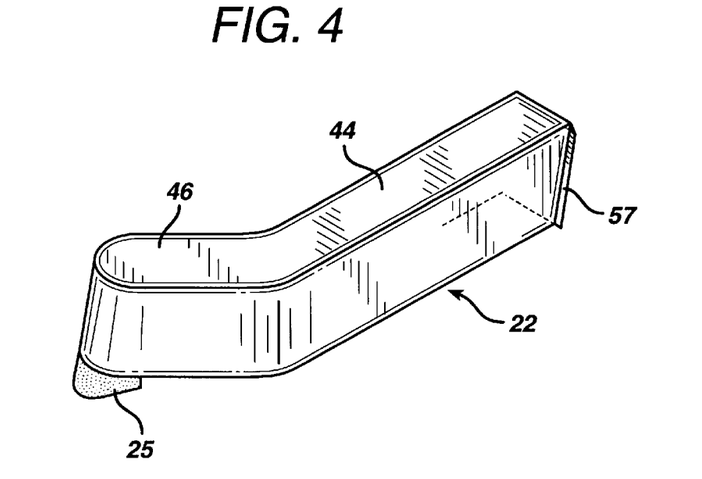
FIG. 4 is a perspective view of a third stump grinding tooth.
Figure 4A:
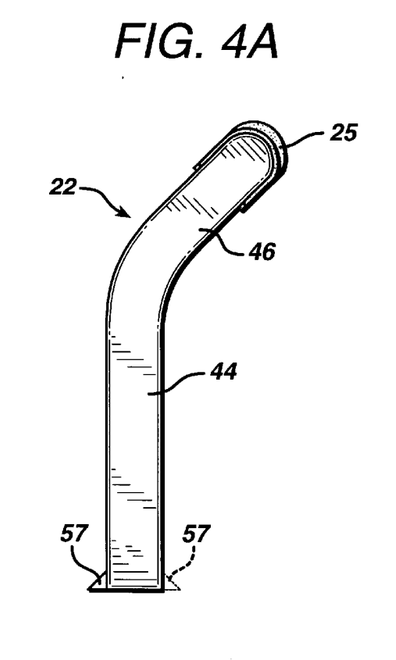
FIG. 4A is a top plan view of a third stump grinding tooth.
Figures 4B, 4C:
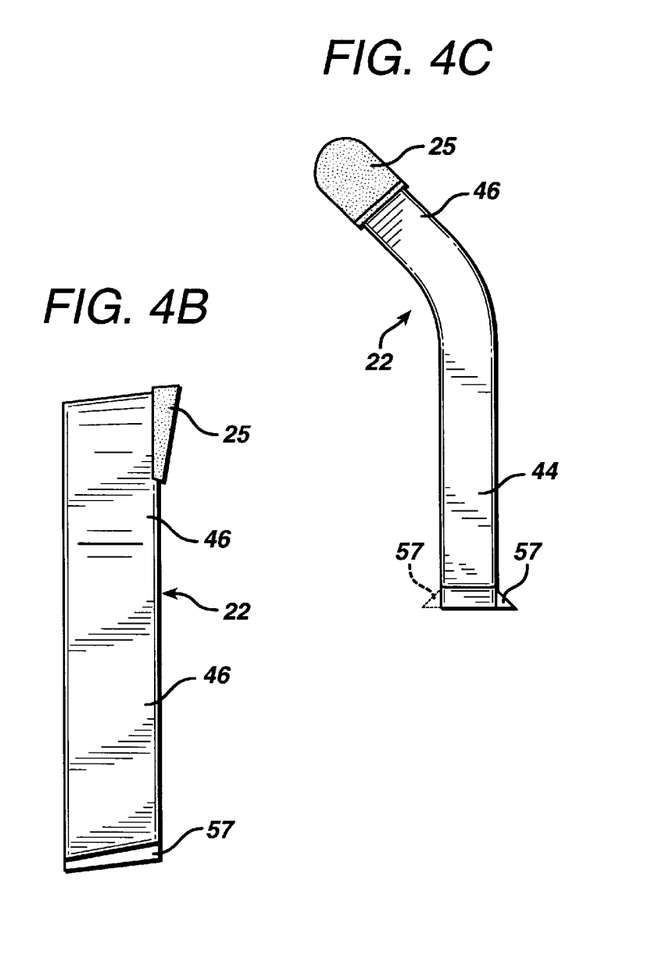
FIG. 4B is a side elevational view of a third stump grinding tooth.
FIG. 4C is a bottom plan view of a third stump grinding tooth.

The rear end of shaft portion 44 includes an elongated pin 58 which extends through a hole 59 formed through sidewalls 50 and 54, along a longitudinal axis essentially parallel to axis Y-Y. Alternatively, pin 58 may extend at any angle through walls 52 and 56, or any angle through walls 50 and 54. When tooth 22 is properly seated in slot 34 of pocket 24, pin 58 is positioned in abutting relation to the rear surface 38 (or milled portion 38') of the pocket, thereby securely retaining tooth 22 in secure, non-sliding relation to pocket 24, and preventing axial movement of tooth 22 with respect to pocket 24. An alternative design to having a pin 58 extending through shaft portion 44, as shown in FIGS. 3–3C, includes the rear edge of one of walls 50, 52, 54 and 56 being swedged or coined in order to form a flange 57 which will abut the rear surface 38 of pocket 24.

Teeth 22 may further include a pair of longitudinally spaced holes 59, 61 (as opposed to a single hole 59) formed through shaft portion 44 (preferably extending through walls 50 and 54, but, perhaps, extending through any two walls of shaft portion 44). The longitudinal spacing of holes 59 and 61 permit pin 58 to be inserted in either of them, with the choice of which hole being dependent upon whether the round pocket 24 or milled pocket 24' is being used. By offering the two holes 59 and 61, one size shaft portion 44 can be used with either pocket 24 or 24' while maintaining the proper gauging distance of the tooth/pocket combination (i.e., by choosing the appropriate hole 59 or 61 through which to insert pin 58, the distance between the cutting bit 25 and leading edge of the pocket 24 or 24' will be the same regardless of the fact that pocket 24 has a longer longitudinal slot 34 than does pocket 24').

To permit easy removal and insertion of pin 58 in holes 59 or 61, while not compromising the tight fit of pin 58 in hole 59 or 61, pin 58 is comprised of a strip of metal having ductile, resilient properties and having first and second terminal edges 64, 66, respectively, which is rolled into a cylindrical shape. The resilience of the metal gives pin 58 a spring-like quality. Therefore, by rolling pin 58 into a cylinder having a diameter slightly larger than the diameter of holes 59 and 61, it must be force fit into the holes. Accordingly, the user must utilize a tool (e.g., pliers) which will permit pin 58 to be squeezed into a smaller diameter and then, at least, partially inserted into hole 59 or 61. A hammer may then be used to tap pin 58 entirely through hole 59 or 61. The resilient quality of pin 58 forces it to spring outwardly, thereby becoming biased against the wall of holes 59 and 61, and ensuring a secure fit. To change the hole through which pin 58 extends, the user must tap and/or pull the pin out from the hole in which it extends by using an appropriate tool, such as a hammer and/or pliers. Pin 58 may then be squeezed as previously described in order to be inserted through the other hole.

In use, one tooth 22 is positioned in slot 34 of each pocket 24, and pocket 24 is securely fastened to wheel 12 via bolts 60, which pass through pocket holes 25 and 26 and wheel holes 18, with tooth 22 being positioned in clamped relation in between the pocket and wheel surface 14 or 16. Due to the thickness T of tooth 22 being slightly greater than the depth d of slot 34, wall 56 of tooth 22 is in contacting relation with wheel surface 14 or 16, thereby ensuring that tooth 22 does not chatter during the cutting operation. However, it is necessary that bolts 60 are torqued to a predetermined level that ensures the secure clamping of the tooth's shaft portion 44 between wheel 12 and pocket 24. Head portion 46 extends outwardly beyond the wheel's edge 20 with cutting bit 25 being appropriately positioned for engaging a stump on its downward stroke. Therefore, as wheel 12 rotates, bringing cutting bit 25 into engagement with a stump, tooth 22 experiences a reaction force which causes wall_to become biased against sidewall$_{13}$. This, in turn, causes body portion 44 and pocket 24 to degrade, and may further result in tooth 22 pin 58 being positioned in biased relation to rear surface (or milled portion 38), tooth 22 is prevented from moving axially outwardly from pocket 24 and will therefore remain securely retained within pocket 24.

As an alternate embodiment of the present invention, pocket 24 may include a second slot 68 formed in perpendicularly intersecting relation to slot 34, and adjacent the rear end of pocket 24. Slot 68 is shaped to accommodate a pin 58 extending perpendicularly through walls 50 and 54 of shaft portion 44. The position of pin 58 and slot 68 is such that the tooth/pocket combination is appropriately gauged. Accordingly, slot 68 provides an alternate mechanism by which to securely retain and automatically gauge tooth 22 in pocket 24.

What is claimed is:

1. A pocket and tooth combination for use on a conventional stump grinding apparatus having a wheel mounted for rotation about its central axis and including a peripheral edge that maintains first and second opposing, planar surfaces in spaced, parallel relation to one another, said pocket and tooth combination comprising:
    a) a tooth having an elongated shaft portion of predetermined cross-section and including a longitudinal axis and front and rear ends, and a head portion integrally and longitudinally extending from said shaft portions' front end;
    b) a pocket having first and second planar surfaces held in spaced relation to one another by an integral, peripheral edge, and further including leading and trailing edges, and an elongated slot formed through one of said first and second planar surfaces from said leading edge to said trailing edge, said slot being adapted to complimentarily receive said shaft portion therein;
    c) said tooth further including a member extending transverse to said longitudinal axis of said shaft portion adjacent the rear end thereof, and positioned in abutting relation to said trailing edge of said pocket when said tooth is seated in said pocket.

2. The combination of claim 1, wherein said tooth further includes at least one hole formed through said shaft portion, adjacent the rear end thereof.

3. The combination of claim 2 wherein said member is a pin which extends through said at least one hole formed through said shaft portion.

4. The combination of claim 1, wherein said predetermined cross-section of said shaft portion is essentially rectangular.

5. The combination of claim 1, wherein said peripheral edge of said pocket is round.

6. The combination of claim 1, wherein said trailing edge of said pocket is straight and the remainder of said peripheral edge is round.

7. The combination of claim 1, wherein said member is a swedged portion of said shaft portion which forms a flange, wherein said flange is positioned in abutting relation to said trailing edge of said pocket when said tooth is seated in said slot of said pocket.

8. The combination of claim 1, wherein:
    a) said tooth includes first and second holes formed through said shank portion, adjacent the rear end thereof, and said first and second holes being longitudinally spaced from one another; and
    b) said peripheral edge of said pocket is shaped in the form of one of the following groups: an entire circle; and a partial circle with said pocket's trailing edge being straight.

9. The combination of claim 8, wherein said member is a pin that is removably and securely positionable through either of said first and second holes.

10. A stump grinding tooth for use in a conventional stump grinding apparatus having a wheel mounted for rotation about its central axis and a pocket including a slot formed longitudinally therethrough in which said tooth sits, said tooth being securely clamped between said pocket and said wheel, said tooth comprising:
    a) an elongated shaft portion having a longitudinal axis, front and rear ends and a predetermined cross-section;
    b) a head portion integrally and longitudinally extending from said front edge of said shaft portion; and
    c) at least one hole formed through said shaft portion, adjacent the rear edge thereof.

11. The tooth of claim 10, and further comprising a pin securely and removably positionable in at least one hole, whereby said pin is positioned in abutting relation to said trailing edge of said pocket when said tooth is properly positioned between said pocket and said wheel.

12. The tooth of claim 10, wherein said shaft portion includes first and second holes formed therethrough, said first and second holes being longitudinally spaced from one another and being positioned adjacent said rear end of said shaft portion.

13. The tooth of claim 12, and further comprising a pin securely and removably positionable in either of said first and second holes.

14. A stump grinding tooth for use in a conventional stump grinding apparatus having a wheel mounted for rotation about its central axis and a pocket including a slot formed longitudinally therethrough in which said tooth sits, said tooth being securely clamped between said pocket and said wheel, said tooth comprising:
    a) an elongated shaft portion having a longitudinal axis, front and rear ends and a predetermined cross-section;
    b) a head portion integrally and longitudinally extending from said front edge of said shaft portion; and
    c) said shaft portion being swedged adjacent said rear end thereof, thereby forming a flange on said shaft portion, whereby said flange is positioned in abutting relation to said trailing edge of said pocket when said tooth is appropriately positioned in clamped relation between said pocket and said wheel.

\* \* \* \* \*